United States Patent
Nam et al.

(10) Patent No.: US 9,091,810 B2
(45) Date of Patent: Jul. 28, 2015

(54) SHAPE-VARIABLE OPTICAL ELEMENT AND OPTICAL READ/WRITE DEVICE INCLUDING THE SAME

(71) Applicant: Electronics and Telecommunications Research Institute, Daejeon (KR)

(72) Inventors: Sae-Kwang Nam, Daegu (KR); Ki-Uk Kyung, Daejeon (KR); Sung-Ryul Yun, Daejeon (KR); Sun-Tak Park, Incheon (KR); Bong-Je Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/327,030

(22) Filed: Jul. 9, 2014

(65) Prior Publication Data
US 2015/0036474 A1 Feb. 5, 2015

(30) Foreign Application Priority Data
Jul. 30, 2013 (KR) .................. 10-2013-0090240

(51) Int. Cl.
*G11B 7/00* (2006.01)
*G02B 3/14* (2006.01)
*G11B 7/1372* (2012.01)

(52) U.S. Cl.
CPC .............. *G02B 3/14* (2013.01); *G11B 7/1372* (2013.01)

(58) Field of Classification Search
None
See application file for complete search history.

(56) References Cited

U.S. PATENT DOCUMENTS

| | | | |
|---|---|---|---|
| 6,791,741 B2 * | 9/2004 | Hishioka | 359/291 |
| 7,209,280 B2 * | 4/2007 | Goossens | 359/290 |
| 7,261,736 B1 * | 8/2007 | Azar | 623/6.22 |
| 7,301,708 B2 * | 11/2007 | Kuiper et al. | 359/665 |
| 7,535,626 B2 | 5/2009 | Kosaka et al. | |
| 7,719,771 B2 | 5/2010 | Wu et al. | |
| 8,282,004 B2 | 10/2012 | Wang et al. | |
| 2004/0184384 A1 * | 9/2004 | Spoonhower et al. | 369/112.24 |
| 2005/0030438 A1 * | 2/2005 | Nishioka | 349/21 |
| 2008/0100905 A1 | 5/2008 | Kato et al. | |
| 2013/0038944 A1 * | 2/2013 | Chang et al. | 359/666 |

FOREIGN PATENT DOCUMENTS

| | | |
|---|---|---|
| JP | 2006-256201 A | 9/2006 |
| KR | 10-2006-0132750 A | 12/2006 |
| KR | 10-2008-0029870 A | 4/2008 |
| WO | WO-2005/104109 A1 | 11/2005 |

* cited by examiner

*Primary Examiner* — Brenda Bernardi
(74) *Attorney, Agent, or Firm* — Rabin & Berdo, P.C.

(57) ABSTRACT

An optical read/write device in accordance with an embodiment of the present invention includes a lens portion configured to irradiate light emitted from a light source to an optical recording medium, and the lens portion includes: a flexible shape-variable lens; and an electrode portion provided on the shape-variable lens. The shape of the shape-variable lens can be changed when voltage is applied to the electrode.

9 Claims, 2 Drawing Sheets

SHAPE-VARIABLE OPTICAL ELEMENT AND OPTICAL READ/WRITE DEVICE INCLUDING THE SAME

CROSS-REFERENCE TO RELATED APPLICATIONS

This application claims the benefit of Korean Patent Application No. 10-2013-0090240, filed with the Korean Intellectual Property Office on Jul. 30, 2013, the disclosure of which is incorporated herein by reference in its entirety.

BACKGROUND

1. Technical Field

The present invention relates to a shape-variable optical element and an optical read/write device including the shape-variable optical element.

2. Background Art

Every optical disc drive (ODD), such as compact disc (CD), digital versatile disc (DVD) and Blu-ray disc, which are currently available in the markets, stores data in a disc by varying transmittance and reflectance of light.

Generally, data are stored in the circular plate shape of disc, and laser beam converged through a lens is reflected, refracted or penetrated on the surface of the disc, at which time the disc drive reads the data by reading a variation in the phase or polarization of the light that is changed on the surface of the disc. One of such traditional storage media is CD, and the Blu-ray disc is developed recently to store a large capacity by increasing the degree of integration in the storage area. As more information can be inputted/outputted to and from a single disc, there has been an increasing demand for optical information device with faster input/output functionality.

In the case of currently commercialized optical information devices, data is inputted or outputted using a single lens, and thus the disc needs to be spun faster in order to read and write the data faster. However, the revolving speed of the disc cannot be increased infinitely, thereby hindering the growth of large-capacity input/output technology.

SUMMARY

The present invention provides a shape-variable optical element that can adjust the focus or focal distance.

The present invention also provides an optical read/write device that has a fast input/output speed.

A shape-variable optical element in accordance with an embodiment of the present invention includes: a flexible shape-variable lens; and an electrode portion provided on the shape-variable lens, and a shape of the shape-variable lens can be changed when voltage is applied to the electrode.

A shape of the electrode portion can be changed when voltage is applied to the electrode.

The electrode portion can be provided on a surface of the shape-variable lens, and the electrode portion can be provided on an entire surface of the shape-variable lens. Meanwhile, the electrode portion can be provided inside the shape-variable lens.

The electrode portion can be made of electroactive polymer.

An optical read/write device in accordance with another embodiment of the present invention includes a lens portion configured to irradiate light emitted from a light source to an optical recording medium, and the lens portion includes: a flexible shape-variable lens; and an electrode portion provided on the shape-variable lens. The shape of the shape-variable lens can be changed when voltage is applied to the electrode.

The lens portion can include the shape-variable lens in plurality, and each of the shape-variable lenses can include at least one of the electrode.

The plurality of shape-variable lenses can form an array structure, and the plurality of shape-variable lenses can be individually controlled.

A shape of the electrode portion can be changed when voltage is applied to the electrode.

DETAILED DESCRIPTION

Figure 1:
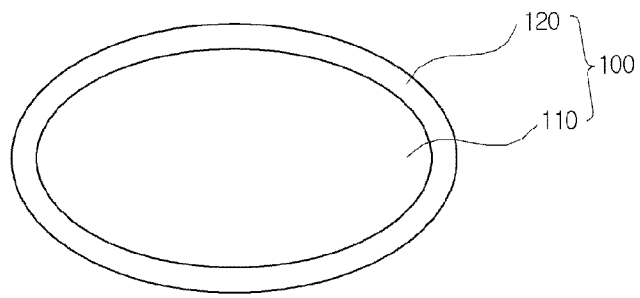
FIG. 1 shows a shape-variable optical element in accordance with a first embodiment of the present invention.

Hereinafter, certain embodiments of the present invention will be described in detail with reference to the accompanying drawings. Any substantially identical elements in the description below and accompanying drawings will be assigned with same reference numerals and will not be redundantly described. Moreover, whenever it is deemed that providing detailed description of any relevant known function or element will inadvertently evade the gist of the present invention, such description will be omitted.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

FIG. 1 shows a shape-variable optical element in accordance with a first embodiment of the present invention.

Referring to FIG. 1, the shape-variable optical element 100 includes a shape-variable lens 110 and an electrode portion 120 provided thereon.

The shape-variable lens 110 allows light to penetrate but can change the shape thereof. The shape-variable lens 110 can be made of a transparent and flexible material, for example, transparent electroactive polymer (EAP).

The electrode portion 120 is provided on a surface of the shape-variable lens 110 to surround the shape-variable lens 110. An electrode portion can be constituted by having electrodes coated or attached partially or entirely on a film. The shape of the electrode portion 120 can be changed when external voltage is supplied thereto. For example, the electrode portion 120 can be made of electroactive polymer (EAP).

EAP has been receiving much attention recently because not only does it have a fast response speed, large operation displacement and low driving power consumption but its superb workability, which is inherent in a polymer material, makes it possible to be lighter, thinner and smaller.

There are mainly two kinds of EAP according to the operation method-ionic EAP, in which polymer is contraction-expansion deformed by movement and diffusion of ions, and electronic EAP, in which deformation is made by polarization.

Ionic EAP, which includes electrorheological fluids (ERP), carbon nanotubes (CNT), conducting polymers (CP), ionic polymer-metal composites (IPMC), ionic polymer gels (IPG), etc., has various strengths such as a great operating force, fast response speed, low applied voltage.

Electronic EAP, which includes liquid crystal elastomers (LCE), electro-viscoelastic elastomers, electrostrictive polymer, electrostrictive graft elastomers, dielectric elastomers, ferroelectric polymers, etc., has strengths such as a fast response speed and precise displacement adjustment but has a shortcoming of requiring a high applied voltage.

Once external voltage is applied to the electrode portion 120, the shape of the electrode portion 120 is changed. Here, since the electrode portion 120 is provided on the surface of the shape-variable lens 110, which is made of a flexible material, the shape of the shape-variable lens 110 is changed as the shape of the electrode portion 120 is changed.

Figure 2:
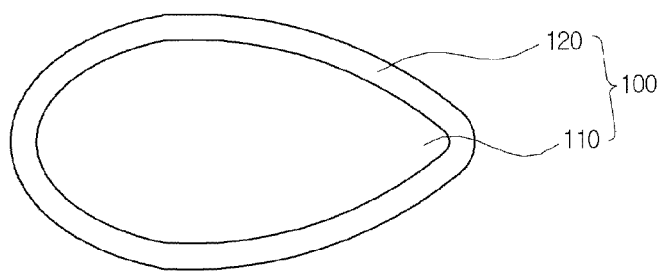
FIG. 2 shows the case of external voltage supplied to the shape-variable optical element shown in FIG. 1.

FIG. 2 shows the case of external voltage supplied to the shape-variable optical element shown in FIG. 1.

As illustrated in FIG. 2, when the external voltage is supplied to the electrode portion 120, the shape of the electrode portion 120 is changed, and accordingly the shape of the shape-variable lens 110 is changed. For example, the higher the voltage applied to the electrode portion 120 is, the more the electrode portion 120 can be elongated. Accordingly, the shape of the electrode portion 120 can be controlled by the voltage supplied thereto.

The change in the shape of the shape-variable lens 110 causes the direction of refraction of light passing through the lens 110 to change. As a result, the focal point or the focal distance of the shape-variable lens 110 is changed. As such, according to the present embodiment, it is possible to adjust the focal point or focal distance of the shape-variable lens 110 by as much as it is required.

Meanwhile, it is possible to provide the electrode portion at a certain portion of the shape-variable lens, in which case the shape of the shape-variable lens can be still changed according to the deformation of the electrode portion.

Figure 3:
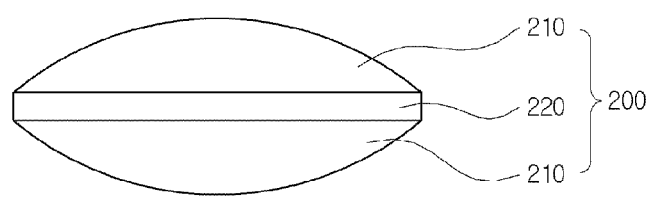
FIG. 3 shows a shape-variable optical element in accordance with a second embodiment of the present invention.

FIG. 3 shows a shape-variable optical element in accordance with a second embodiment of the present invention.

Referring to FIG. 3, the shape-variable optical element 200 includes a shape-variable lens 210 and an electrode portion 220 provided thereon.

The electrode portion 220 is provided inside the shape-variable lens 210, and the electrode portion 220 is made of a material that changes the shape thereof when external voltage is applied.

Figure 4:
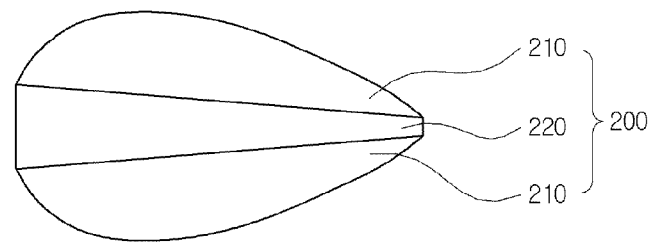
FIG. 4 shows the case of external voltage supplied to the shape-variable optical element shown in FIG. 3.

FIG. 4 shows the case of external voltage supplied to the shape-variable optical element shown in FIG. 3.

As illustrated in FIG. 4, when the external voltage is supplied to the electrode portion 220, one end of the electrode portion 220 can be contracted and the other end thereof can be expanded due to the applied voltage difference. Accordingly, the shape of the shape-variable lens 210 is changed, which causes the direction of refraction of light passing through the lens 210 to change. Therefore, according to the present embodiment, it is possible to adjust the focal point or focal distance of the shape-variable lens 210.

The rest of the configurations and elements of the second embodiment is identical or similar to those of the first embodiment described above, and thus the detailed description thereabout will be omitted.

Figure 5:
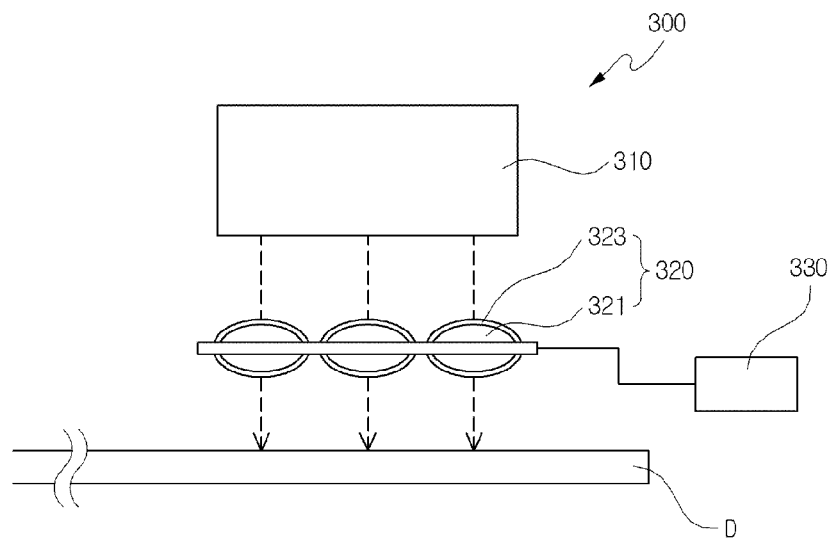
FIG. 5 shows an optical read/write device in accordance with a third embodiment of the present invention.

FIG. 5 shows an optical read/write device in accordance with a third embodiment of the present invention.

Referring to FIG. 5, the optical read/write device 300 includes light source 310, lens portion 320 and controller 330.

The light source 310 emits light that is irradiated to the optical recording medium D. For instance, the light source 310 can be a laser diode. The light source 310 can be provided singularly or in plurality.

The optical recording medium D can be a compact disc (CD), a digital versatile disc (DVD) or a Blu-ray disc, which a medium that writes data optically.

The lens portion 320 irradiates the light emitted from the light source 310 to the optical recording medium D. The lens portion 320 forms an array structure that includes a plurality of shape-variable lenses 321 and electrodes 323 provided thereon. Meanwhile, the plurality of shape-variable lenses 321 and the electrodes 323 provided thereon can be individually controlled.

The shape-variable lens 321 is a lens that can change the shape thereof. When voltage is applied to the electrode portion 323, the shape of the shape-variable lens 321 is changed. Accordingly, the focal point and the focal distance of the shape-variable lens 321 can be changed. The shape-variable lens 321 can be made of a flexible material, for example, polymer.

The electrode portion 323 can be provided on a surface or inside the shape-variable lens 321. The electrode portion 323 can be made of a transparent, conductive material. For example, the electrode portion 323 can be made of electroactive polymer (EAP).

The shape-variable lens 321 and electrode portion 323 of the present embodiment are identical to the shape-variable lens and electrode portion of the optical element in accordance with the first embodiment of the present invention that has been described above. However, the present invention is not limited to this, and it is also possible that, if necessary, the shape-variable lens and electrode portion of the optical element in accordance with the second embodiment of the present invention are used.

The controller 330 controls the change of shape of the shape-variable lens 321 through the electrode portion 323. That is, the controller 330 adjusts the shape change of the shape-variable lens 321 by adjusting external voltage applied to the electrode portion 323.

Figure 6:
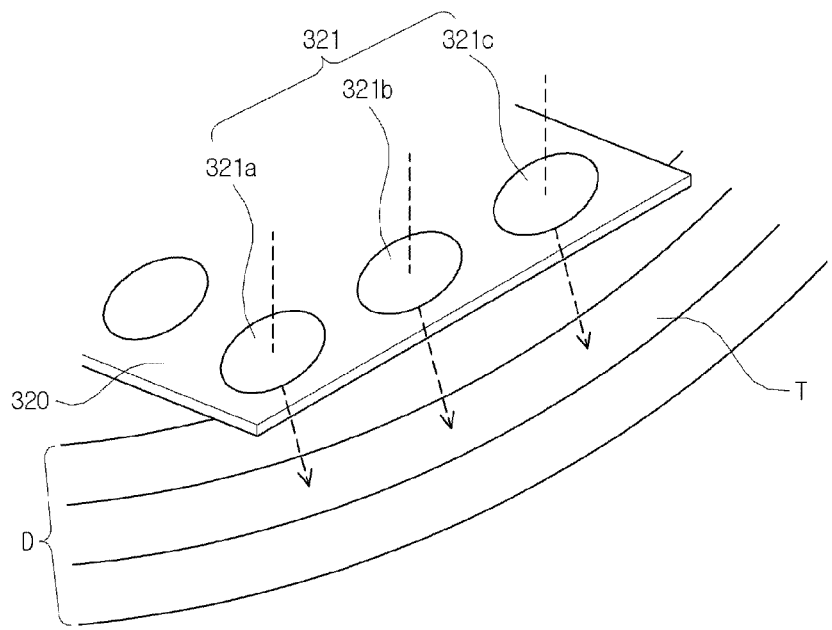
FIG. 6 shows how a shape-variable lens operates in the optical read/write device in accordance with the third embodiment of the present invention.

FIG. 6 shows how the shape-variable lens operates in the optical read/write device in accordance with the third embodiment of the present invention.

Referring to FIG. 6, the optical recording medium D is in the shape of a circular plate and thus has a plurality of tracks formed in the direction of circumference. The lens portion 320 has the shape-variable lenses 321 arranged therein in the radial direction of or in the direction of the tracks of the optical recording medium D. The shape-variable lenses 321a, 321b, 321c arranged in the direction of the tracks of the optical recording medium D can read successive data by irradiating light to a corresponding track T.

However, since the track of the optical recording medium D is formed along the direction of circumference, the track may not be possibly aligned with the direction in which the shape-variable lenses 321a, 321b, 321c are arranged. That is, in the case where the shape-variable lenses 321a, 321b, 321c are arranged linearly, there occurs a difference from the curved shape of the track. In such a case, by modifying the shape of the shape-variable lenses 321a, 321b, 321c, this difference can be corrected by adjusting the focal distance and the focal point to correspond to the curved shape of the track.

Although certain embodiments of the present invention have been described, it shall be appreciated that there can be a very large number of permutations and modification of the present invention by those who are ordinarily skilled in the art to which the present invention pertains without departing from the technical ideas and boundaries of the present invention, which shall be defined by the claims appended below. Accordingly, the technical ideas of the present invention shall not be limited by the embodiments and the drawings disclosed herein.

It shall be also appreciated that many other embodiments other than the embodiments described above are included in the claims of the present invention.

What is claimed is:

1. A shape-variable optical element comprising:
a flexible shape-variable lens; and
at least one electrode portion provided on the shape-variable lens,
wherein the at least one electrode portion is provided on an entire surface of the shape-variable lens,
wherein, when voltage is applied to the at least one electrode portion, a shape of the at least one electrode portion changes, and a shape of the shape-variable lens changes as the shape of the at least one electrode portion changes.

2. The shape-variable optical element of claim 1, wherein the at least one electrode portion comprises a material made of electroactive polymer.

3. The shape-variable optical element of claim 1, wherein, when the voltage is applied to the at least one electrode portion, a portion of the shape-variable lens contracts and another portion of the shape-variable lens expands.

4. A shape-variable optical element comprising:
a flexible shape-variable lens; and
at least one electrode portion provided on the shape-variable lens,
wherein the at least one electrode portion is provided inside the shape-variable lens, and
wherein, when voltage is applied to the at least one electrode portion, a shape of the at least one electrode portion changes, and a shape of the shape-variable lens changes as the shape of the at least one electrode portion changes, and wherein, when the voltage is applied to the at least one electrode portion, a portion of the shape-variable lens contracts and another portion of the shape-variable lens expands.

5. The shape-variable optical element of claim 4, wherein the at least one electrode portion comprises a material made of electroactive polymer.

6. An optical read/write device comprising at least one lens portion configured to irradiate light emitted from a light source to an optical recording medium,
wherein the lens portion comprises:
a flexible shape-variable lens; and
at least one electrode portion provided on the shape-variable lens,
wherein the at least one electrode portion is provided inside the shape-variable lens, and
wherein, when voltage is applied to the at least one electrode portion, a shape of the at least one electrode portion changes, and a shape of the shape-variable lens changes as the shape of the at least one electrode portion changes.

7. The optical read/write device of claim 6, wherein the lens portion comprises the shape-variable lens in plurality.

8. The optical read/write device of claim 7, wherein the plurality of shape-variable lenses form an array structure.

9. The optical read/write device of claim 8, wherein the plurality of shape-variable lenses are individually controlled.

* * * * *